United States Patent
De Luca et al.

(10) Patent No.: US 8,131,459 B2
(45) Date of Patent: Mar. 6, 2012

(54) METHOD FOR THE DETERMINATION OF A RECEIVER FOR LOCATION INFORMATION

(75) Inventors: Enrico De Luca, Caserta (IT); Alessandro Lala, Naples (IT); Martin Israelsson, Spånga (SE); Anders Molander, Linköping (SE); Maurizio Iovieno, Mercato San Severino (IT); Árpád Kormos, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 836 days.

(21) Appl. No.: 10/495,354

(22) PCT Filed: Nov. 15, 2002

(86) PCT No.: PCT/EP02/12847
§ 371 (c)(1), (2), (4) Date: May 12, 2004

(87) PCT Pub. No.: WO03/043366
PCT Pub. Date: May 22, 2003

(65) Prior Publication Data
US 2004/0267445 A1 Dec. 30, 2004

(30) Foreign Application Priority Data
Nov. 16, 2001 (EP) ..................................... 01830711

(51) Int. Cl.
*G01C 21/00* (2006.01)
(52) U.S. Cl. ........................................ 701/207; 701/200
(58) Field of Classification Search .................. 701/207, 701/200; 455/456.1, 456.3, 414.1, 433, 502; 370/328
See application file for complete search history.

(56) References Cited

U.S. PATENT DOCUMENTS

| | | | |
|---|---|---|---|
| 6,275,706 B1 * | 8/2001 | Rune | 455/456.1 |
| 6,707,813 B1 * | 3/2004 | Hasan et al. | 370/356 |
| 6,741,868 B1 * | 5/2004 | Park et al. | 455/552.1 |
| 6,792,277 B2 * | 9/2004 | Rajaniemi et al. | 455/456.1 |
| 6,801,781 B1 * | 10/2004 | Provost et al. | 455/466 |
| 6,898,433 B1 * | 5/2005 | Rajaniemi et al. | 455/456.1 |
| 6,950,876 B2 * | 9/2005 | Bright et al. | 709/230 |
| 6,961,588 B2 * | 11/2005 | Watanabe | 455/560 |
| 7,116,984 B1 * | 10/2006 | Muhonen et al. | 455/456.1 |

(Continued)

FOREIGN PATENT DOCUMENTS
WO    WO 01/69951 A1 *   9/2001
(Continued)

OTHER PUBLICATIONS

3rd Generation Partnership Project Technical Specification (3GPP) (http://www.3gpp.org/ftp/tsg_sa/TSG_SA/TSGS_10/Docs/PDF/SP-000596.pdf).*

(Continued)

*Primary Examiner* — Khoi Tran
*Assistant Examiner* — Jorge Peche

(57) ABSTRACT

The invention relates to a method for distinguishing between LOCATION REPORT messages to avoid ambiguities. Therefore, a value of an information element of request type is returned by a radio network controller, depending on an intended receiver of the location information. A control node receiving the information element value analyses said value and determines the receiver depending on the result of said analysis.

9 Claims, 5 Drawing Sheets

U.S. PATENT DOCUMENTS

| | | | |
|---|---|---|---|
| 7,200,384 B1* | 4/2007 | Tervo et al. | 455/414.1 |
| 7,200,385 B1* | 4/2007 | Wallenius et al. | 455/414.1 |
| 2003/0148774 A1* | 8/2003 | Naghian et al. | 455/456 |
| 2003/0186710 A1* | 10/2003 | Muhonen et al. | 455/456.5 |
| 2005/0003829 A1* | 1/2005 | Lala et al. | 455/456.1 |
| 2005/0032532 A1* | 2/2005 | Kokkonen et al. | 455/456.6 |
| 2005/0043038 A1* | 2/2005 | Maanoja et al. | 455/456.1 |
| 2006/0003775 A1* | 1/2006 | Bull et al. | 455/456.1 |
| 2006/0009201 A1* | 1/2006 | Gallagher et al. | 455/414.1 |
| 2006/0058038 A1* | 3/2006 | Das et al. | 455/456.1 |
| 2006/0063534 A1* | 3/2006 | Kokkonen et al. | 455/456.1 |

FOREIGN PATENT DOCUMENTS

| | | |
|---|---|---|
| WO | WO 0169951 A | 9/2001 |

OTHER PUBLICATIONS

3GPP Technical Specification TS 123.271 Version 4.3.0 Oct. 2001, pp. 1-70, XP002196637.

* cited by examiner

FIG. 1 (state of the art)

FIG. 2 (state of the art)

US 8,131,459 B2

METHOD FOR THE DETERMINATION OF A RECEIVER FOR LOCATION INFORMATION

FIELD OF INVENTION

The invention relates to a method for determining the receiver of location information sent by an access network node. The invention further relates to a method for a control node and a method for an access network node for executing the invention, a mobile services switching centre and a GPRS support node adapted to executing said method and software adapted to control a control node and a software adapted to control an access network node in a way that the nodes execute the invented method.

DESCRIPTION OF PRIOR ART

Location services are defined for example in 3GPP (third Generation Partnership project) specifications TS22.071, version 3.2.0, published January 2000. In general, location services deliver a service that is related to the location of user equipment. To provide a location service, a service provider depends on the knowledge of the location of user equipment.

FIG. 1 depicts the architectures standardised in 3GPP TS 23.271, version 5.0.0, published October 2001. The architecture comprises two Gateway Mobile Location centres GMLC1, GMLC2, connected to core network nodes MSC, SGSN. One of the gateway mobile location centres GMLC1 is connected to an external location service client LCSC, to a home location server MSC or SGSN and a home subscriber server HLR or HSS. The other gateway mobile location centre GMLC2 is connected to an external public land mobile network PLMN. The control nodes MSC, SGSN are connected to the home location server HLR and a home subscriber server HSS, as well as to a radio access network UMTS Radio Access node SRNC. The radio access node is a radio network controller SRNC and is further connected to a node B and a further radio network controller RNC. The node B serves a user equipment UE.

The Gateway Mobile Location Centres GMLC1, GMLC2 contain functionality required to support location services. In one network, there may be more than one Gateway Mobile Location Centre.

The Gateway Mobile Location Centre GMLC1, GMLC2 is the first node an external location services in a mobile network. The Gateway Mobile Location Centre GMLC1, GMLC2 may request routing information from the home location register HLR or the home subscriber server HSS. After performing registration authorisation, it sends positioning requests to mobile services switching centre MSC or the serving GPRS (General Packet Radio Service) support node SGSN and receives final location estimates from the corresponding entity.

The home location register HLR and the home subscriber server HSS contain location services subscription data and routing information. For a roaming mobile subscriber, home location register/home subscriber server HLR/HSS may be in a different mobile network from the one he is currently roaming into. The location services subscription data are transferred from the home location register/home subscriber server HLR/HSS to the mobile services switching centre MSC or the serving GPRS support node SGSN during the location update procedure.

Location services subscription data include a privacy profile containing the privacy classes for which location of the target subscriber is permitted. Each privacy class is treated as a distinct supplementary service with its own supplementary service code.

The mobile services switching centre MSC and the serving GPRS support node SGSN contain the functionality responsible for the user's location services subscription and privacy. The location services functions of mobile services switching centre MSC and the serving GPRS support node SGSN are also related to charging and billing, location services co-ordination of all location requests, authorisation and authentication of the positioning requests received from the Gateway Mobile Location Centre GMLC1, GMLC2.

The serving radio network controller SRNC provides, among the others, the serving mobile location client functionality that means it is the node in which the user equipment location information is calculated.

The location services system provides the opportunity of requesting the location of the mobile user terminals from an external location services client (Mobile Terminating Location Request=MT-LR), the location from the terminal itself (Mobile Originating Location Request=MO-LR) and the auto-induced location from the network (Network Induced Location Request=NI-LR).

The node B, the radio network controller SRNC, RNC and the user equipment UE are not explained in more detail.

FIG. 2 gives an example of a circuit switched, mobile terminating, location request.

In this figure the access network nodes node B, serving radio network controller SRNC and radio network controller RNC are combined in the radio access network RAN. An external entity EE sends a location request LRQ to a mobile service switching centre MSC to gain location information of a user equipment UE. The mobile services switching centre MSC executes paging, authentication and ciphering with the user equipment UE. These steps may be redundant in the case of a busy user equipment.

In the depicted case of UMTS (Universal Mobile Telecommunications System) access, the Location Request is sent from the mobile services switching centre MSC to the radio access network RAN by means of RANAP (Radio Access Network Application Protocol) LOCATION_REPORTING_CONTROL message LRC. The steps performed to execute a calculation of a position of the user equipment UE depend on proprietary positioning methods. The result of the calculations is received in RANAP LOCATION_REPORT message LR. The location request result is sent from the mobile services switching centre MSC to the external entity EE in a LOCATION_REQUEST_RESULT message LRR.

LOCATION_REPORTING_CONTROL and LOCATION_REPORT RANAP messages are used for both Location Services and other mobile services switching centre MSC or serving GPRS support node functions SGSN, not related to Positioning, asking to report upon change of Service Area. If positioning is requested, the serving radio access controller shall report on a per request base, if reporting upon change of Service Area is requested, the serving radio access controller shall report whenever the user equipment UE moves between Service Areas.

It is a shortcoming of the system as described in 3GPP TS 23.271, version 5.0.0 and in 3GPP TS 25.413, version 4.2.0, that it is not possible to distinguish a LOCATION_REPORT message received as a result of a Service Area change from the same message received as an answer on an external location request. In the case that a service area change is reported by a LOCATION_REPORT message while a LOCATION_REPORT message is expected as an answer to a LOCATION_REPORTING_CONTROL message that demands an immediate response, there is no mechanism to distinguish between the respective LOCATION_REPORT messages.

It is object of the invention to introduce a system that can distinguish between LOCATION_REPORT messages, sent as an answer on different events.

SUMMARY OF THE INVENTION

In order to distinguish between LOCATION_REPORT messages, a component of the LOCATION_REPORT message, the request type information element, is analyzed according to specific parameters. Analysis of the request type causes either the location information to be sent immediately or a trigger to be set that determines the appropriate receiver of the location information. The appropriate receiver includes an external entity or a network node.

Further advantageous is that an identification of the request type is included in the LOCATION_REPORT message only if the location information is intended for a network node according to claim 4. By this, the handling of LOCATION_REPORT message is simplified significantly.

The control nodes, that is the GPRS support node SGSN and the mobile services switching centre MSC comprise means for analysing a value of a request type information element filed of a LOCATION_REPORT message and means for determining a receiver of location information. These means can be implemented by hardware, for example as a logic circuit or by software, for example a software module, or both.

DETAILED DESCRIPTION OF EMBODIMENTS

In the following the invention is described in more detail by means of embodiments and figures.

The invention uses the already existing information element request type of the LOCATION_REPORT message for determining the recipient of a location information. The determination is executed in a control node. In the case that the request is a packet switched location request it is executed by a SGSN, in the case that it is a circuit switched request it is executed by a mobile services switching centre MSC.

Figure 1:
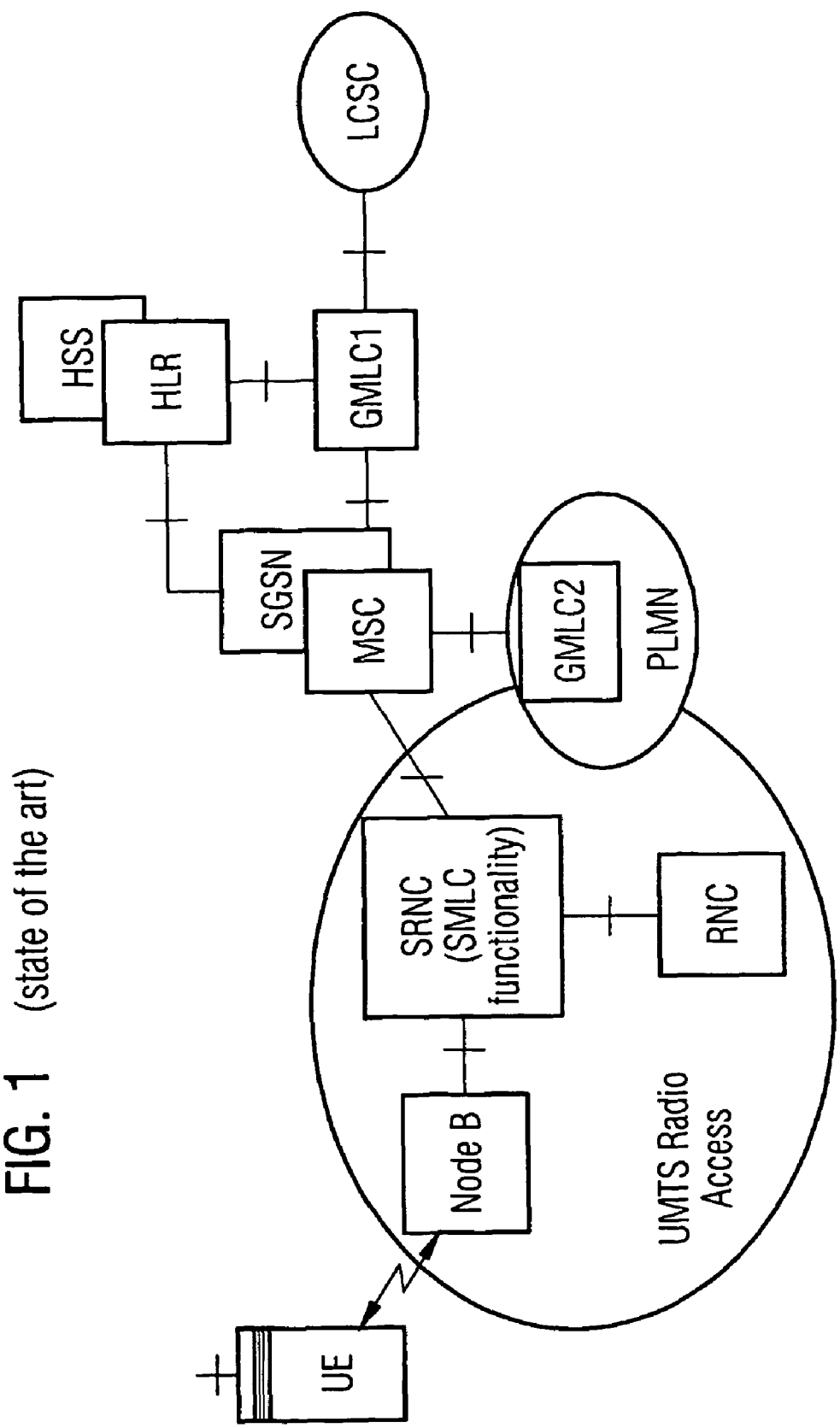
FIG. 1: depicts an architecture for the support of location services as state of the art, (state of the art)
Figure 2:
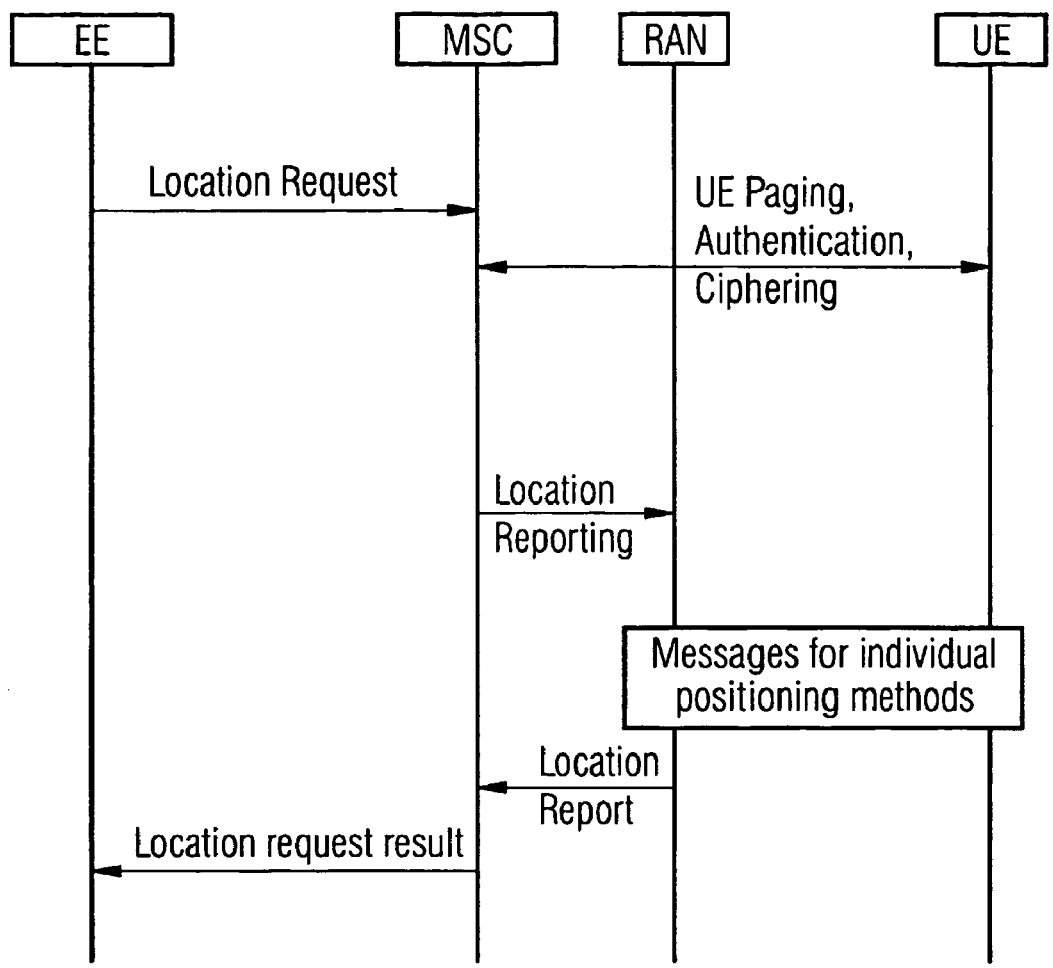
FIG. 2: depicts a signal flow for a location request as state of the art, (state of the art)
Figure 3:
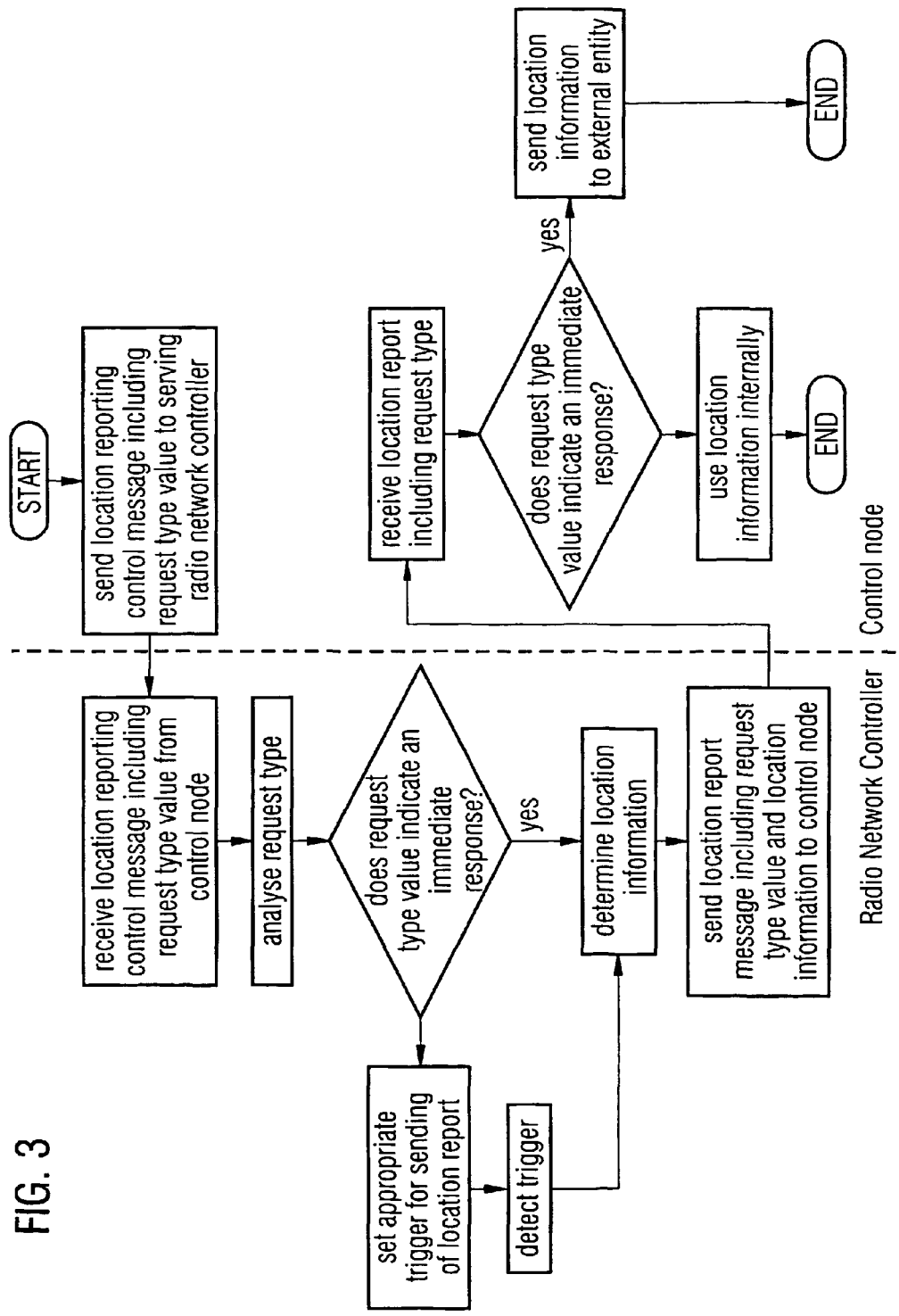
FIG. 3: depicts a flow diagram of the invented method.

FIG. 3 depicts a flow chart of the invented method. In a first step, a control node sends a LOCATION_REPORTING_CONTROL message to a radio network controller. This message comprises an information element request type that identifies the type of request. The type of request is identified for example that the radio access network is requested to send location information in a LOCATION_REPORT message at a change of service area by a user equipment or as a direct response on the LOCATION_REPORTING_CONTROL message.

In a next step, the radio network controller receives the LOCATION_REPORTING_CONTROL message. It analyses it whether the value of the information element request type indicates to send a LOCATION_REPORT message immediately, or not. If a LOCATION_REPORT message is required immediately, the radio network controller determines the location of a user equipment and sends the location information together with the request type value received in the LOCATION_REPORTING_CONTROL message to the core network node. If the LOCATION_REPORT message is required after a certain trigger event, in this example a change of service area by the user equipment, the radio network controller sets the respective trigger event and monitors, whether the user equipment changes the service area. If so, the radio network controller detects this trigger event, determines the location information of the user equipment and sends it together with the received request type value to the control node.

The control node receives the LOCATION_REPORT message including the request type. It checks whether the request type value indicated an immediate response. If so, the location information is intended for an external entity and the control node sends it to said external entity. If not, the information is used internal of the network.

Figure 4:
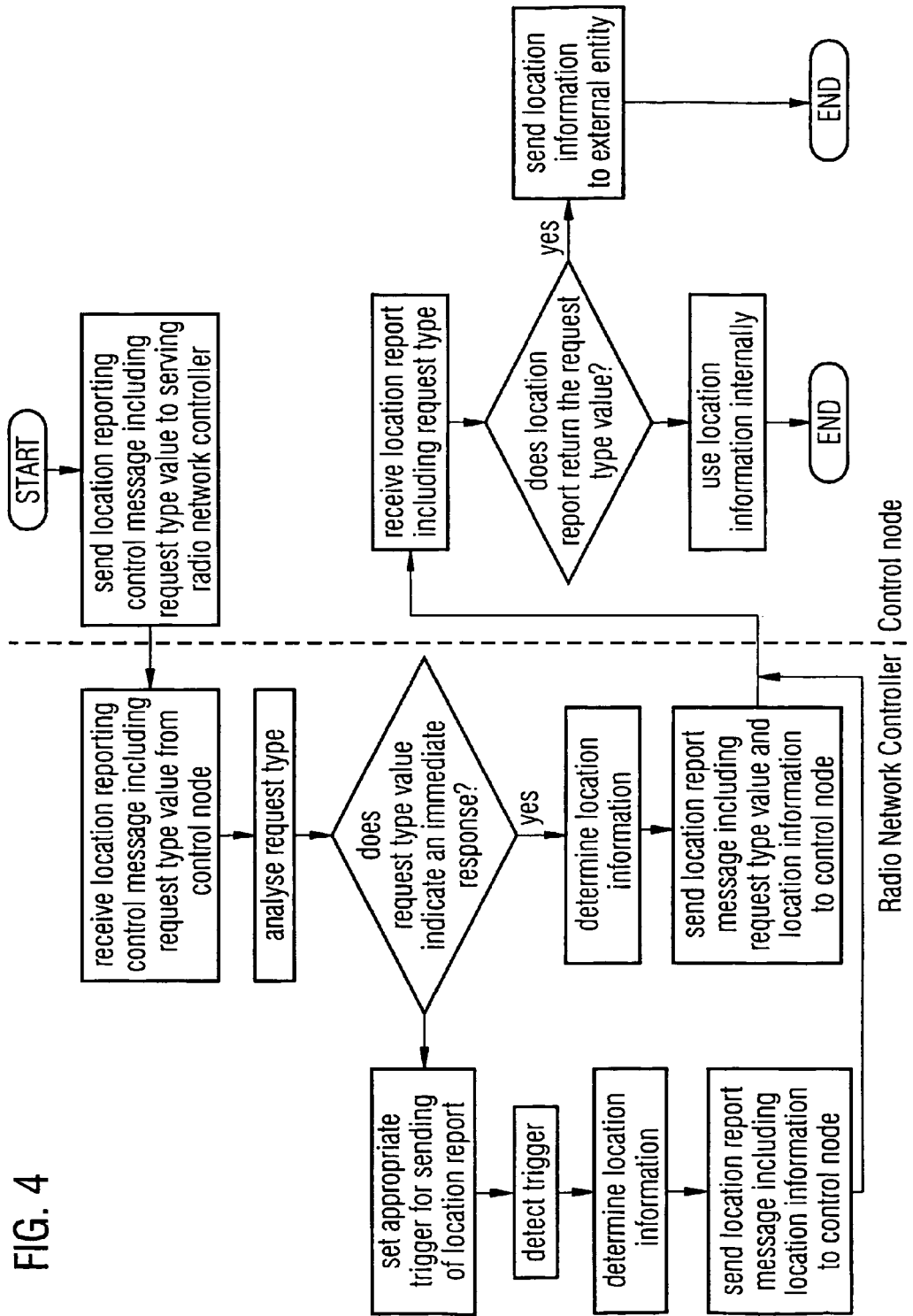
FIG. 4: depicts a further flow diagram of the invented method.
Figure 5:
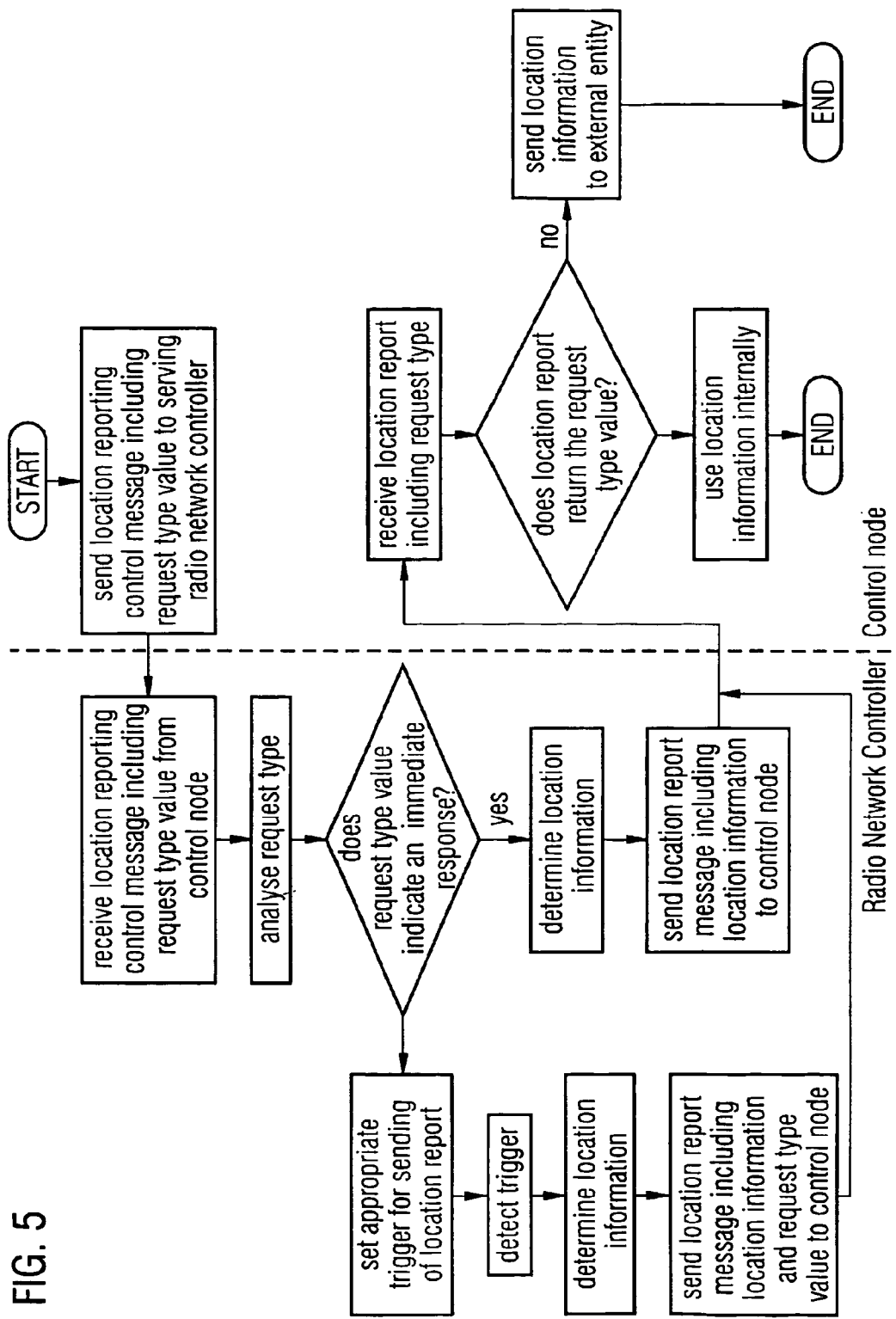
FIG. 5: depicts a further flow diagram of the invented method.

FIG. 4 depicts another flow chart of an alternative of the invented method to the implementation as described by FIG. 3. In a first step, a control node sends a LOCATION_REPORTING_CONTROL message to a radio network controller. This message comprises an information element request type that identifies the type of request. The type of request is identified for example that the radio access network is requested to send location information in a LOCATION_REPORT message at a change of service area by a user equipment or as a direct response on the LOCATION_REPORTING_CONTROL message.

In a next step, the radio network controller receives the LOCATION_REPORTING_CONTROL message. It analyses it whether the value of the information element request type indicates to send a response, that is a LOCATION_REPORT message, immediately, or not. If a LOCATION_REPORT message is required immediately, the radio network controller determines the location of a user equipment and sends the location information together with the request type value received in the LOCATION_REPORTING_CONTROL message to the core network node. If the LOCATION_REPORT message is required after a certain trigger event, in this example a change of service area by the user equipment, the radio network controller sets the respective trigger. The radio network controller monitors, whether the user equipment changes the service area. If so, the radio network controller detects this trigger, determines the location information of the user equipment and sends it to the control node. In this embodiment, the lack of the request type information element value in the LOCATION_REPORT message, indicates that the message is to be used network internal.

The control node receives the LOCATION_REPORT message including the request type. It checks whether a request type value is returned. If so, the location information is intended for an external entity and the control node sends it to said external entity. If not, the information is used network internal.

FIG. 4 depicts an embodiment of the invention by means of a flow chart, wherein the determining is handled vice versa to the embodiment of FIG. 3. In the embodiment of FIG. 3, a request type value has been returned in the case that the location information is to be used network internal. In the embodiment of FIG. 4 the request type value is returned, when the location information is to be forwarded to an external entity.

Request type values indicating that an immediate response is required are for example: "Request of current location" or "Request of current or last known location".

The invention further relates to software stored on a computer readable medium or in a form that can be loaded into a memory of a computing device. A computing device is for example a control node or a control node server that executes a stored program.

The invention claimed is:

1. Method for determining a receiver for location information in a communication system for mobile telecommunications adapted to operating according to Universal Mobile Telecommunications Systems specifications, wherein the system comprises at least one access network, at least one control node adapted to handle location service requests and an interface to at least one external entity that uses location information, and wherein the following steps are performed by the control node:
   sending a LOCATION_REPORTING_CONTROL message comprising a request type information element for indicating the type of location request to at least one radio network controller of the access network,
   receiving a LOCATION_REPORT message comprising a location information and a request type information element,
   analysing a value of the request type information element received in the LOCATION_REPORT,
   determining a receiver of the location information sent in the LOCATION_REPORT based on the result of the analysis.

2. Method according to claim 1, wherein the request type information element sent in the LOCATION_REPORT message always comprises an identification of the type of location request.

3. Method according to claim 1, wherein request type information element sent in the LOCATION_REPORT message comprises an identification of the type of location request in the case that the location information is intended for a network node.

4. Method according to claim 3, wherein the control node is a mobile services switching centre.

5. Method according to claim 3, wherein the control node is a serving general packet radio service support node.

6. The method according to claim 1 further comprising the step of, upon determining the receiver is external to the network, immediately sending the LOCATION_REPORT message to the determined receiver.

7. The method according to claim 6 further comprising the step of, upon determining the receiver is internal to the network, sending the LOCATION_REPORT message upon a specified trigger event.

8. Method for answering a LOCATION_REPORTING_CONTROL message for a radio network controller, the method comprising the following steps:
   receiving from a control node a LOCATION_REPORTING_CONTROL message, comprising a request type information element for indicating the type of location request,
   determining the requested location information, and
   sending a LOCATION_REPORT message comprising the location information and the request type information element wherein a value in the request type information element depends on an intended receiver of the location information, the value of the request type information element being analyzed by the radio network controller and a receiver of the location information is determined based on the result of the analysis.

9. A control node, for handling location service requests, in a Universal Mobile Telecommunication System (UMTS) mobile communication system, wherein the control node is configured to:
   send a LOCATION_REPORTING_CONTROL message comprising a request type information element for indicating the type of location request to at least one radio network controller of an access network of the communication system;
   receive a LOCATION_REPORT message comprising a location information and a request type information element;
   analyze a value of the request type information element received in the LOCATION_REPORT message; and
   determine a receiver of the location information sent in the LOCATION_REPORT based on the result of the analysis.

* * * * *

UNITED STATES PATENT AND TRADEMARK OFFICE
CERTIFICATE OF CORRECTION

PATENT NO. : 8,131,459 B2
APPLICATION NO. : 10/495354
DATED : March 6, 2012
INVENTOR(S) : De Luca et al.

Page 1 of 1

It is certified that error appears in the above-identified patent and that said Letters Patent is hereby corrected as shown below:

On the Title Page, in Field (75), under "Inventors", in Column 1, Line 4,
delete "Linkköping (SE);" and insert -- Linköping (SE); --, therefor.

Signed and Sealed this
Nineteenth Day of June, 2012

David J. Kappos
*Director of the United States Patent and Trademark Office*